May 23, 1961 C. W. COULTER 2,984,927

FISH LURE

Filed Sept. 25, 1958

INVENTOR.
CHARLES W. COULTER.

BY Christy, Parmelee & Strickland

ATTORNEYS.

2,984,927
FISH LURE

Charles W. Coulter, Falck Road, McKees Rocks, Pa.

Filed Sept. 25, 1958, Ser. No. 763,355

1 Claim. (Cl. 43—26.2)

This invention is for a lure for fishing, and more particularly an animated plug type of lure wherein appendages are actuated during a part of the cast as the lure is moved through the water to simulate a living creature. This application is a continuation-in-part of a copending application Serial No. 600,616, filed July 27, 1956 and now abandoned.

It has heretofore been proposed to provide fishing lures with rubber band powered motors to propel the lure through the water. According to the present invention a rubber band powered motor is used to actuate leg-like appendages to produce motion in them intended to attract game fish.

One difficulty with the use of casting plugs using any kind of simple motor such as a rubber band type of motor is the fact that these motors tend to unwind very rapidly, so that when such a device is used in a plug, it may rapidly expend its power while the lure is being cast, and the action will be uselessly spent before the plug ever hits the water. The elements of simplicity and size of the plug do not make it practical to use conventional types of governors, or geared spring-driven motors.

An important object of the present invention is to provide a lure using a rubber band powered motor with simple and effective means for preventing free spinning of the driven part so that little action takes place during the cast and the driven part turns slowly when the plug is in the water.

This means is expendable and may require replacement from time to time, and a further object of my invention is to provide a lure in which this part or the rubber band may be readily replaced.

A further object of my invention is to provide a lure which will provide a unique action in the water.

These and other objects and advantages are secured by my invention which may be more fully understood by reference to the accompanying drawing in which.

Figure 1:
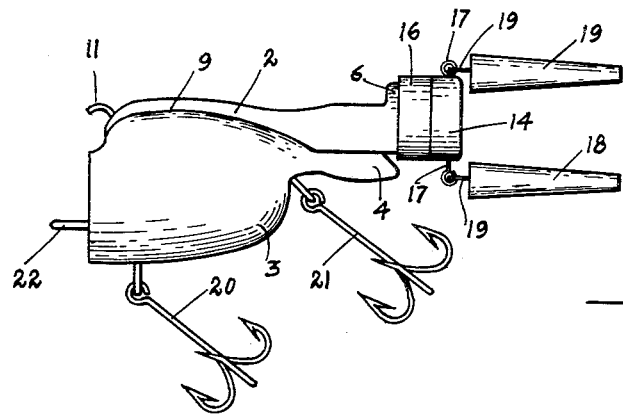
Fig. 1 is a side elevation of a lure embodying my invention.
Figure 2:
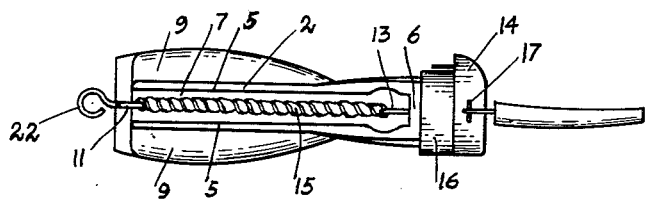
Fig. 2 is a top plan view thereof.
Figure 3:
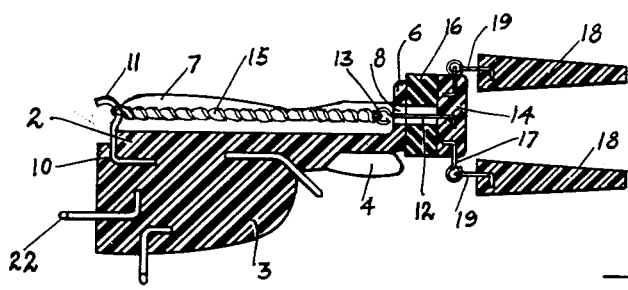
Fig. 3 is a longitudinal section.

Referring to the drawings, and more particularly Figs. 1 to 3 inclusive, the lure comprises a body which may be integrally formed of plastic. This body, designated 2, has a lower belly portion 3 of a reversed boat-like shape with two small tail fins 4, at the rear or pointed end of this portion near the top, one of these being at each side of the longitudinal axis. Along the top of the body there is a trough-like formation having two parallel side walls 5 that terminate at a rear cross wall 6, providing between them a channel or trough 7. There is a hole 8 through the back wall, the end face of the back wall being flat and smooth. The outer faces of the side walls are shown as having upwardly and outwardly convexed shoulders 9. The shape of the body may be variously changed, but this shape resembles in the water somewhat the shape of a frog or well-developed large tadpole, and the shape here shown has certain advantages as hereinafter pointed out.

At the front end of the trough there is an upright post 10 molded into the body and having a hook 11 at its upper end. Passing through the hole 8 is a wire shaft 12 having an eye or hook 13 at its forward end and having its rear end embedded in a plastic disk 14. One end of a rubber band is threaded through the eye 13 and the two ends are engaged over the hook 11 at the front, so that there are four strands 15 of rubber twisted together extending from the hook 11 to the eye 13 under some tension. The strands of rubber are within the channel 6 and so are protected from weeds or other debris in the water.

According to the present invention there is a disk of wax 16, such as paraffin or paraffin-like material, between the flat outer face of the end or cross wall 6 and the hub or disk 14, and this constitutes the governor.

The hub 14 has two diametrically opposed radial wires 17 with eyes at their outer ends. Leg-like appendages 18 have wires 19 linked through these eyes so that the appendages are articulated to the hub and may flail about.

Cluster hooks 20 and 21 are flexibly attached to the body, one under the tail fins and one near the forward end at the bottom. An eye 22 is provided on the front end of the body to which the fish line is attached.

The rubber band motor is wound by turning the hub 14, twisting the rubber in a well-known manner. It would be expected that upon release of the hub, it would spin at high speed and spend its energy in an instant, but the wax disk 16 acts as a governor because as the bands twist, the pressure against the wax increases, and as the pressure increases the friction increases in an unexpected manner so that whether the motor is fully wound or nearly unwound, the hub will rotate at a nearly uniform speed. In the water, the water does not wet the wax and the hub will unwind relatively slowly and jerkily for a period of time to cover a good part of the retrieving of the cast. As a matter of fact, in warmer weather the wax tends to restrain rotation of the hub 14 in the air, but upon striking the colder water, exerts less friction.

After a period of use, the wax may need replacing, and for this purpose the hole 8 is large enough so that upon unhooking the rubber band at the front, the rotatable assembly can be drawn out at the trailing end of the lure and a new wax disk put into place upon removal of the used one. An inexpensive mold may be used to shape the wax disks.

While wax, especially paraffin wax, is most suitable for the purpose and is inexpensive, beeswax may be used or other waxes that are not too adhesive, and certain wax-like thermoplastic substances can be used, though less effectively, as for example polyethylene or gutta-percha.

Because of the removability of the rotatable parts, it is not only easy to replace a wax disk, but replacement of the rubber can also be accomplished, and the open trough formation at the top facilitates this replacement. If the rubber band tends to break it will usually break during "winding up" so that for this reason there is little chance of losing the rotatable parts in the water. Even if it does break in the water, the loose strands of rubber will ordinarily retain the rotatable parts until the lure has been reeled in. The hooks are secured to the body and not to the rotating parts, which of course is of advantage, first because the fish generally strikes from below and seeks to attack the body, and secondly the pull of the fish is not imposed on the rubber bands.

By having the appendages 18 connected to the periphery of the hub, the appendages rotate through a relatively large circle, creating an action or commotion that attracts the fish and they also better serve to aid in retarding the rapid spinning of the hub, so that the action is more prolonged, erractic and of life-like speed. By having the body of the shape shown with a relatively massive "belly" portion or boat-shaped portion 3, which is of solid plastic, the body is restrained from rotating and moves through the water with the belly down, and this is also aided by having the eye 22 eccentric to and below the axis of rotation of the shaft 12.

Figure 4:
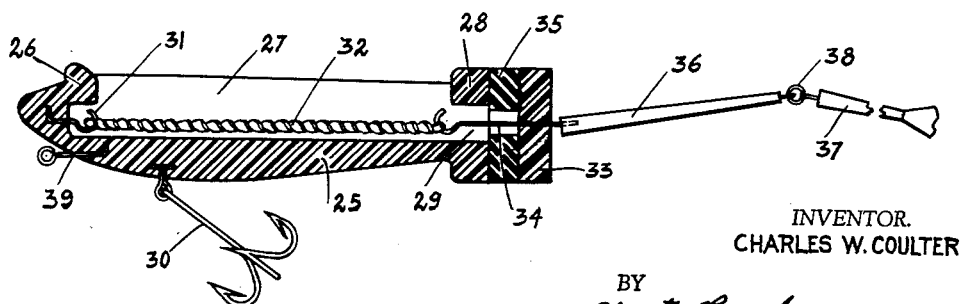
Fig. 4 is a view similar to Fig. 3 showing a modified construction.

The construction shown in Fig. 4 is much the same as the one shown in Figs. 1 to 3, except as to the shape of the body and the articulated appendages. In this figure the body 25 is more in the shape of a small fish with a head 26, and there is an open trough 27 along the top of the back. There is an end wall 28 at the rear with a flat outer outer bearing surface, and there is a hole 29 through it corresponding to the hole 8. The lower part of the body is solid and has a cluster hook 30 suspended therefrom. At the forward end of the trough 27 there is a hook 31 to which the ends of the rubber bands 32 are attached. At the rear end is a circular hub or disk 33 having a forwardly-extending shaft 34 passing through the hole 29 with a hook at its forward end to which the other ends of the bands 32 are attached. A wax disk 35 is interposed between the disk 33 and the outer face of the end wall 28. It serves the same purpose as the corresponding disk 16 of Figs. 1 to 3. There are two appendages 36 attached to diametrically-opposite points of the disk 33 similar to the leg element or appendages 18, except that each of these has a second section 37 attached to its extremity through an articulated joint 38.

An eye 39 is secured in the front end of the body below the axis of rotation of the shaft 34 to which the line is attached.

This modification has the advantages of the form shown in Fig. 1, except that it is not quite as stable against rotation in the water, but in rotating it may wobble about the eccentric eye 39, giving the appearance of an injured bait fish.

Various other changes and modifications may be made in the device within the contemplation of my invention and under the scope of the following claim.

I claim:

A fishing lure comprising a body having an open groove along the top edge thereof with the mass of the body below the longitudinal axis of the groove whereby the trough is above the center of mass, an eye formed at the forward end of the body to which a line may be attached, a fastening hook at the forward end of the groove, a wall on the body across the rear end of the groove having an opening therethrough, a shaft in said opening having a hook at its forward end, which shaft and hook are removable axially of the body through the end wall, the hook on said shaft being small enough to pass through the opening in said wall, a rubber band in the groove engaging the fastening hook at the forward end of the body and the hook on said shaft at the other end and serving to restrain the shaft against endwise removal from the body, an expendable disc of thermoplastic waxy material bearing against the outer surface of said end wall, said expendable disc having a hole therethrough through which said shaft passes, a hub bearing against said disc to which the rear end of the shaft is fastened, said hub and expendable disc being urged toward the end wall by the rubber band, a pair of trailing appendages attached to the hub, said appendages being attached to the hub at diametrically opposite points, one at each side of the axis of the shaft so that each moves through a circular orbit when the hub is rotated, and a fish hook depending from the body.

References Cited in the file of this patent

UNITED STATES PATENTS

| 1,268,016 | Kingsbury | May 28, 1918 |
| 2,232,102 | Dudek | Feb. 18, 1941 |
| 2,266,234 | Mitchell | Dec. 16, 1941 |
| 2,468,877 | Horton | May 3, 1949 |
| 2,821,044 | Bateman | Jan. 28, 1958 |

FOREIGN PATENTS

| 128,073 | Great Britain | 1919 |